US012680574B2

(12) United States Patent
Katsaros

(10) Patent No.: US 12,680,574 B2
(45) Date of Patent: Jul. 14, 2026

(54) BEARING ASSEMBLY

(71) Applicant: AKTIEBOLAGET SKF, Gothenburg (SE)

(72) Inventor: Padelis Katsaros, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 557 days.

(21) Appl. No.: 17/858,230

(22) Filed: Jul. 6, 2022

(65) Prior Publication Data

US 2023/0022331 A1 Jan. 26, 2023

(30) Foreign Application Priority Data

Jul. 14, 2021 (DE) .......................... 102021207513.4

(51) Int. Cl.
F16C 19/54 (2006.01)
F16C 25/08 (2006.01)
(52) U.S. Cl.
CPC .......... F16C 25/083 (2013.01); F16C 19/543 (2013.01); *F16C 2326/02* (2013.01)
(58) Field of Classification Search
CPC ...... F16C 19/38; F16C 19/383; F16C 19/385; F16C 19/386; F16C 19/542; F16C 19/543; F16C 25/083; F16C 2202/22
See application file for complete search history.

(56) References Cited

U.S. PATENT DOCUMENTS

| | | | | | |
|---|---|---|---|---|---|
| 2,615,767 | A | * | 10/1952 | Gunn | .................... F16C 19/385 |
| | | | | | 384/571 |
| 3,986,754 | A | * | 10/1976 | Torrant | ................... F16C 19/54 |
| | | | | | 29/898.063 |
| 4,172,621 | A | * | 10/1979 | Yoshida | .................. F16C 25/06 |
| | | | | | 29/725 |
| 7,524,115 | B2 | * | 4/2009 | Komori | .................. B60B 27/00 |
| | | | | | 384/544 |

FOREIGN PATENT DOCUMENTS

| | | | |
|---|---|---|---|
| CN | 202628804 U | * | 12/2012 |
| JP | 2003074570 A | * | 3/2003 ............ F16C 19/184 |

OTHER PUBLICATIONS

Translaton of JP2003074570 obtained Mar. 11, 2024.*
Translation of CN 202628804 obtained Mar. 11, 2024.*

* cited by examiner

*Primary Examiner* — James Pilkington
(74) *Attorney, Agent, or Firm* — J-TEK LAW PLLC; Scott T. Wakeman; Mark A. Ussai

(57) ABSTRACT
A bearing assembly includes a stationary component, a rotatable component and a preloadable double row bearing unit having a rotatable bearing ring and a stationary bearing ring and two rows of rolling elements between the rings. The rotatable bearing ring and/or the stationary bearing ring includes a first part and a second part, and the first part is spaced from the second part by a gap so that the first part and the second part do not touch. At least one elastic element is disposed in the gap and fills the gap.

3 Claims, 2 Drawing Sheets

BEARING ASSEMBLY

CROSS-REFERENCE

This application claims priority to German patent application no. 10 2021 207 513.4 filed on Jul. 14, 2021, the contents of which are fully incorporated herein by reference.

TECHNOLOGICAL FIELD

The present disclosure is directed to a multi-row bearing assembly that includes at least one two-part ring, the two parts of the ring being separated by a gap, and including an elastic element in the gap.

BACKGROUND

In wheel bearing assemblies, in particular for motor vehicles, preassembled and preloaded wheel bearing units are often used that are disposed between an axle element and a wheel hub and allow movement of the wheel hub with respect to the axle element. With the bearing unit preinstalled and set to the correct bearing clearance, it is sufficient to attach the bearing unit to the axle element using an axle nut that is then tightened by a prescribed torque in order to generate the correct preload in the bearing unit. The term "bearing clearance" is understood to mean the total distance by which one bearing ring can be displaced relative to another bearing ring in the radial direction (radial bearing clearance) or in the axial direction (axial clearance). Here the variation of the preload is primarily dependent on an overlap tolerance of the press fits between the hub and the bearing outer ring or rings, and/or between the bearing inner rings and the axle element. The bearing preload has in particular a significant influence on bearing friction as well as the service life of the wheel bearing unit.

This simplified installation, which is made possible by the preset bearing unit, is made more difficult when the bearing unit and the wheel hub, for example, have different temperature expansions, which can be caused, for example, by material differences between the bearing unit and the wheel hub. This can also lead to a larger variation of the preload. In this case, presetting the bearing preload at the factory is very difficult and expensive since the bearings must be measured, grouped, and correspondingly built paired even more precisely than usual.

SUMMARY

It is therefore an aspect of the present disclosure to provide a bearing assembly in which the preload of the bearing assembly varies essentially independently of an overlap tolerance of the press fits.

In the following a bearing assembly is disclosed that includes a stationary component, a rotatable component, and a preloadable multi-row, in particular double row, bearing unit, in which the bearing unit includes at least one rotatable bearing ring and one stationary bearing ring and at least one of the rotatable bearing ring and the stationary bearing ring is configured two-part.

Here the stationary bearing ring is connected to the stationary component. In particular, the stationary bearing ring is connected to the stationary component such that the stationary bearing ring is essentially fixed in an axial direction on the stationary component, wherein "essentially fixed in an axial direction" is understood to mean that for a preloading of the bearing ring, the stationary bearing ring can be displaced in the axial direction slightly, in particular less than 1 mm, preferably less than a fifteenth of a millimeter. Furthermore, the rotatable bearing ring is connected to the rotatable component such that they rotate together, wherein the rotatable bearing ring is preferably installed in the rotatable component using a press fit. Furthermore, the bearing rings are spaced relative to each other in order to receive at least two spaced-apart rows of rolling elements, each row including a plurality of rolling elements, wherein the rolling-element rows roll on associated raceways that are disposed on the rotating ring and on the fixed ring. Furthermore, the rotatable bearing ring in particular can be configured as a one-part bearing ring, and the stationary bearing ring can be configured as a two-part ring. However, the rotatable bearing ring can also be configured as a two-part bearing ring.

In order to provide a bearing assembly that can be used independently of the overlap tolerance of the press fits between the components, in particular the press fit between the rotatable component and the at least one outer ring, a gap is formed between a first and a second part of the two-part ring in an installed state so that the two parts do not touch.

Furthermore, an elastic element is disposed in the gap, which elastic element is configured to fill the gap. The elastic element makes it possible in particular to elastically compensate for differences in the dimensions of the bearing rings and/or the components. Furthermore, the gap can be dimensioned such that it allows a sufficient spacing between the two ring parts so that the two ring parts do not come into contact, regardless of operating conditions and/or temperatures. Since the elastic element can elastically deform or adapt, the elastic element can fill and seal the gap even when the size of the gap changes.

Furthermore, when the influence of the overlap tolerance on the variation of the preload is eliminated, a variation of the bearing friction can be reduced so that the variation of the bearing service life can also be reduced. Due to the reduced variation of the bearing friction, the bearing friction can be better set in an optimal range, whereby in addition the fuel consumption by vehicles and thus their $CO_2$ emissions are reduced.

The preload of the bearing unit is effected in the above-described bearing assembly during a final assembly, for example, at a customer, by measuring the friction during rotation of the rotatable component, such as, for example, the wheel hub, wherein an axle nut serving as a preload element is simultaneously tightened carefully or in small steps until the bearing friction reaches a value that corresponds to the required bearing preload. This furthermore has the advantage that a presetting of the preload of the bearing unit at the factory can be omitted. The axle nut can advantageously be secured against loosening upon achieving the necessary preload, for example, with the aid of a lock nut or another suitable securing means.

The elastic element is preferably manufactured from an elastomeric material, such as, for example, from a thermoplastic elastomer, acrylonitrile butadiene rubber (NBR), fluoroelastomer (FPM), hydrogenated acrylonitrile butadiene rubber (HNBR), polyurethane, and/or silicone. The elastic element is preferably further configured to seal the bearing unit so that a lubricant introduced in the bearing unit remains in the bearing unit, and/or an entry of other lubricants, for example, of the axle system, and/or of water can be prevented. The service life of the bearing unit can thereby also be increased.

According to one preferred embodiment, the elastic element is attached to at least one of the two parts of the two-part ring. This has the advantage that during a disassembly of the bearing unit the elastic element cannot separate from the bearing unit. The elastic element is preferably formed one-piece. Alternatively the elastic element can be formed from two parts, i.e., a first and a second part, wherein the first element is disposed on the first part of the two-part ring, and the second element is disposed on the second part of the two-part ring. In particular, the first part and the second part of the two-part ring can each include an extended shoulder that extends in the axial direction, wherein the extended shoulders lie opposite each other, and wherein in an installed state of the bearing unit the gap is formed between the extended shoulders of the first and of the second part.

According to a further preferred embodiment, the bearing unit is a preassembled bearing unit. The two parts of the two-part ring are preferably connected to each other using an attachment element. The bearing unit can thereby be installed as a preassembled unit on the axle element.

According to a further preferred exemplary embodiment, the stationary and/or the rotatable component is manufactured from a first material having a first coefficient of thermal expansion, and the bearing ring of the bearing unit associated with this component is manufactured a second material having a second coefficient of thermal expansion different from the first coefficient of thermal expansion. For example, the rotatable component can be formed from the first material. The rotatable component is preferably a hub. Furthermore, the first material can be a light metal alloy, in particular an aluminum alloy, and the second material can be a steel alloy, in particular rolling-element bearing steel. Light metal has the advantage that considerable weight savings can thereby be achieved.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
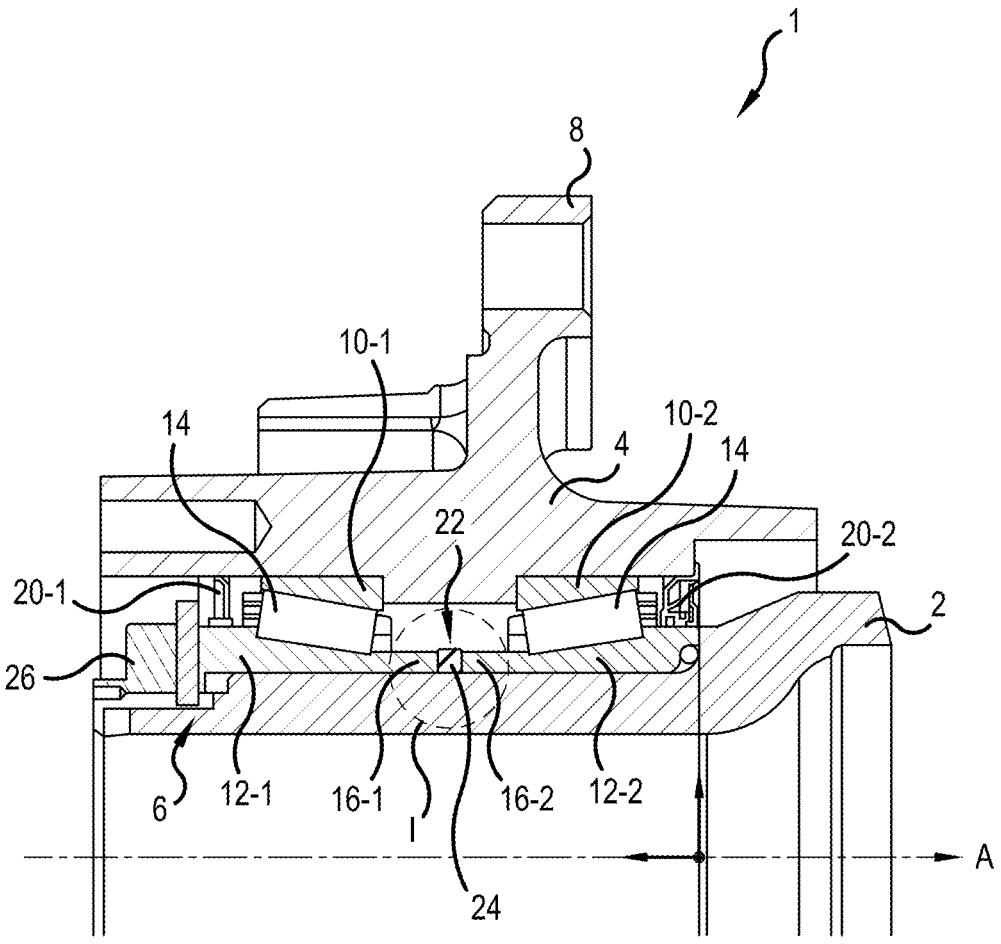
FIG. 1 is a partial sectional view through a bearing assembly according to a first exemplary embodiment.
Figures 2, 3:
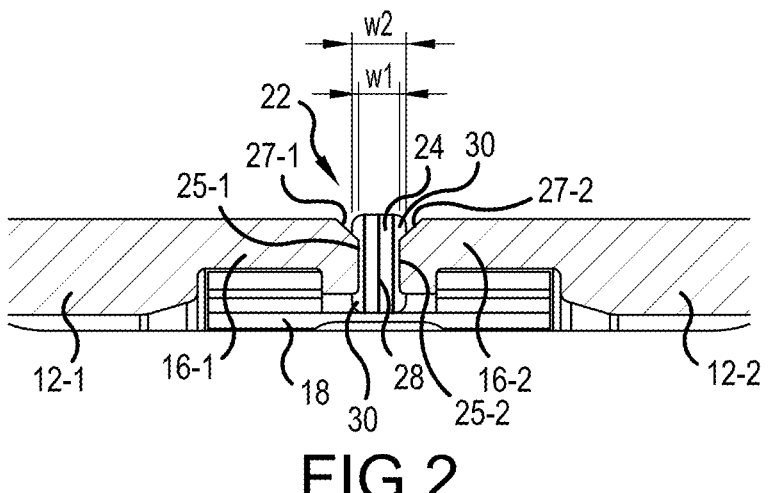
FIG. 2 is a detail view of region I of FIG. 1.
FIG. 3 is a detail view of a bearing unit according to a second exemplary embodiment.

FIG. 1 shows a bearing assembly 1 according to a first embodiment, and FIG. 2 shows a detail view of the section I of FIG. 1.

The bearing assembly 1 comprises an axle bridge or an axle stub 2 as a stationary component, a hub 4 as a rotatable component, and a bearing unit 6. The hub 4 is configured in particular to be connected at a radial end 8 to a rim and a wheel (not shown).

The bearing unit 6 is a double row bearing unit including two rotatable outer rings 10-1, 10-2 and a stationary two-part inner ring 12-1, 12-2. The inner ring 12-1, 12-2 is connected to the axle stub 2, and the rotatable outer rings 10-1, 10-2 are connected to the hub 4 such that the outer rings 10-1, 10-2 and the hub 4 rotate together, wherein the two outer rings 10-1, 10-2 are pressed into the hub 4. Two rows of rolling elements 14 are disposed between the inner ring 12-1, 12-2 and the outer ring 10-1, 10-2 that roll on associated raceways (not indicated) that are formed on the outer ring 10-1, 10-2 and the inner ring 12-1, 12-2. Alternatively a bearing unit including a two-part outer ring can also be used.

The inner ring comprises a first part 12-1 and a second part 12-2, wherein each of the two ring parts 12-1, 12-2 includes an extended shoulder 16-1, 16-2 that extends in the axial direction A. The extended shoulders 16-1, 16-2 lie opposite each other. On a side facing the axle, the two extended shoulders 16-1, 16-2 are connected to each other using an attachment element 18 (FIG. 2) in order to form a preassembled bearing unit 1.

On the two axial outer sides, the bearing unit 1 includes first and second seal assemblies 20-1, 20-2 that seal an interior of the bearing unit 1. The seal assemblies are in particular part of the preassembled bearing unit 1 and are preferably configured as a cassette seal.

In the case of the bearing assembly 1 shown in FIG. 1, wherein the two outer rings 10-1, 10-2 are installed on the hub 4 via a press fit, when the outer rings 10-1, 10-2 and the hub 4 are manufactured from the same material or from materials that have similar thermal expansion coefficients, such as, for example, cast iron and steel, a variation of the bearing preload depends primarily on the overlap tolerances of the press fits.

Alternatively the hub 4 can be manufactured from a first material, such as, for example, an aluminum alloy having a first coefficient of thermal expansion, and the outer rings 10-1, 10-2 can be manufactured from a second material, such as, for example, rolling-element bearing steel, having a second coefficient of thermal expansion different from the first coefficient of thermal expansion. In such a case, the variation of the bearing preload is not only dependent on the overlap tolerances, but also on the temperature, since the different coefficients of thermal expansion can change the fit of the outer rings 10-1, 10-2 in the hub 4 such that a preload of the bearing unit 6 is reached that can cause a high bearing friction to the point of a locking of the bearing unit 6.

In order to make the bearing assembly 1 essentially independent of the overlap tolerance of the press fits, in an installed state of the bearing unit 1 a gap 22 is formed between the first and the second part 12-1, 12-2 of the two-part inner ring. The gap 22 is dimensioned such that the two parts 12-1, 12-2 do not touch. An elastic element 24 is disposed in the gap 22 that is configured to fill the gap 22. The elastic element thereby makes it possible to elastically compensate for differences in the dimensions of the bearing rings 10-1, 10-2 and 12-1, 12-2 and/or the components, such as the hub 4 and the axle stub 2, but simultaneously ensures a sealing or a closing of the gap 22.

In FIGS. 1 and 2, the elastic element 24 is formed one-piece and preferably attached to one of the two parts 12-1, 12-2 of the inner ring. The elastic element is preferably manufactured from an elastomeric material, such as, for example, from a thermoplastic elastomer, acrylonitrile butadiene rubber (NBR), fluoroelastomer (FPM), hydrogenated acrylonitrile butadiene rubber (HNBR), polyurethane, and/or silicone. In addition, the elastic element 24 is configured to seal the bearing unit 1 so that a lubricant introduced into the bearing unit 1 remains in the bearing unit 1.

Each of the parts 12-1, 12-2 of the inner ring 12 has an axially inner end 25-1, 25-2. A first beveled surface 27-1 extends from the axially inner end 25-1, and a second beveled surface 27-2 extends from the axially inner end 25-2. The elastic element 24 has a radial central portion 28 and radial end portions 30, and an axial width w1 of the radial central portion 28 is less than an axial width w2 of the radial end portions 28. The elastic element 24 contacts the axially inner end 25-1 of the first part 12-1, the first beveled surface 27-1, the axially inner end 25-2 of the second part 12-2 and the second beveled surface 27-2.

With the bearing unit 1 the preload is not preset at the factory (i.e., by providing a defined bearing clearance), but rather only during a final assembly, e.g., at a customer, by the friction during the rotation of the hub 4 being measured, wherein an axle nut 26 serving as preload element is simultaneously tightened carefully or in small steps until the measured bearing friction reaches a value that corresponds to the required bearing preload. The axle nut, which is an example of a preloading means, can advantageously be secured against loosening upon the achieving of the necessary preload, for example, with the aid of a lock nut or another suitable securing means (not shown).

FIG. 3 shows a detail view of a bearing assembly 1 according to a second exemplary embodiment. In the exemplary embodiment of FIG. 3, the elastic element 24 is formed from two parts, i.e., a first part 24-1 and a second part 24-2, wherein the first part 24-1 is disposed on the first part 12-1 of the inner ring, and the second part 24-2 is disposed on the second part 12-2 of the two-part inner ring.

In summary, a bearing assembly 1 is provided that can be used independently of the overlap tolerance between the components. This is made possible by the gap 22 that is formed in an installed state of the bearing unit 6 between a first and a second part 12-1, 12-2 of the two-part ring so that the two parts 12-1, 12-2 do not touch. It can thereby be achieved that the preload of the bearing unit 6 is independent of the overlap tolerance of the press fits. Since the dependence of the preload on the overlap tolerance can be eliminated, with the proposed bearing assembly 1 it is possible to use components that show different temperature expansions due to different coefficients of thermal expansion. This is because the tolerance capacities that have become available by eliminating the dependence of the preload on the overlap tolerance of the press fits are now available for tolerances due to different temperature expansions of the components.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing assembly comprising:
a stationary component,
a rotatable component,
a preloadable double row bearing unit, the bearing unit including a rotatable bearing ring and a stationary bearing ring, and
a first row of a first plurality of rolling elements between the rotatable bearing ring and the stationary bearing ring and a second row of a second plurality of rolling elements between the rotatable bearing ring and the stationary bearing ring,
a preloading means for preloading the preloadable double row bearing unit, wherein the preloadable double row bearing unit is preloaded by the preloading means,
wherein the stationary bearing ring includes a first part and a second part,
wherein the stationary bearing ring is connected to the stationary component and wherein the rotatable bearing ring is connected to the rotatable component such that they rotate together,
wherein the first part is spaced from the second part by a gap so that the first part and the second part do not touch,
wherein at least one elastic element formed from an elastomeric material is disposed in the gap and fills the gap, and
wherein an axial width of a radial central portion of the elastic element is less than an axial width of a radial end portion of the elastic element.

2. The bearing assembly according to claim 1,
wherein the gap is located between an axially inner end of the first part and an axially inner end of the second part,
wherein a first beveled surface extends from the axially inner end of the first part and a second beveled surface extends from the axially inner end of the second part, and
wherein the elastic element contacts the axially inner end of the first part, the first beveled surface, the axially inner end of the second part and the second beveled surface.

3. A bearing assembly comprising:
a stationary component,
a rotatable component,
a preloadable double row bearing unit, the bearing unit including a rotatable bearing ring and a stationary bearing ring, and
a first row of a first plurality of rolling elements between the rotatable bearing ring and the stationary bearing ring and a second row of a second plurality of rolling elements between the rotatable bearing ring and the stationary bearing ring, a preloading means for preloading the preloadable double row bearing unit, wherein the preloadable double row bearing unit is preloaded by the preloading means, wherein the stationary bearing ring includes a first part and a second part, wherein the stationary bearing ring is connected to the stationary component and wherein the rotatable bearing ring is connected to the rotatable component such that they rotate together, wherein the first part is spaced from the second part by a gap so that the first part and the second part do not touch, wherein at least one elastic element formed from an elastomeric material is disposed in the gap and fills the gap, wherein the gap is located between an axially inner end of the first part and an axially inner end of the second part, wherein a first beveled surface extends from the axially inner end of the first part and a second beveled surface extends from the axially inner end of the second part, and wherein a radially outer portion of the elastic element is located axially between the first beveled surface and the second beveled surface.

* * * * *